United States Patent [19]

Roberts et al.

[11] 4,029,888
[45] June 14, 1977

[54] ARC FURNACE CONTROL SYSTEM

[75] Inventors: Roland W. Roberts, Pittsburgh; Michael R. Sochacky, Jr., Murrysville, both of Pa.

[73] Assignee: Robicon Corporation, Pittsburgh, Pa.

[22] Filed: May 27, 1976

[21] Appl. No.: 690,581

[52] U.S. Cl. .................................................... 13/13
[51] Int. Cl.[2] .................. H05B 7/148; H05B 7/152
[58] Field of Search ............................ 13/9, 12, 13

[56] References Cited
UNITED STATES PATENTS

| | | | |
|---|---|---|---|
| 3,408,447 | 10/1968 | Beck | 13/13 |
| 3,435,121 | 3/1969 | Jackson | 13/13 |
| 3,662,075 | 5/1972 | Sakai | 13/13 |

Primary Examiner—R. N. Envall, Jr.
Attorney, Agent, or Firm—Brown, Murray, Flick & Peckham

[57] ABSTRACT

An electric arc furnace control system is provided for positioning the furnace electrodes in accordance with the resistance of the arc. This is accomplished by balancing the arc current signal against a voltage signal multiplied by a signal representing the arc circuit power factor to provide an error signal. An analog command signal is then derived from the error signal to control the direction and speed of the electrode hoist drive motor.

12 Claims, 4 Drawing Figures

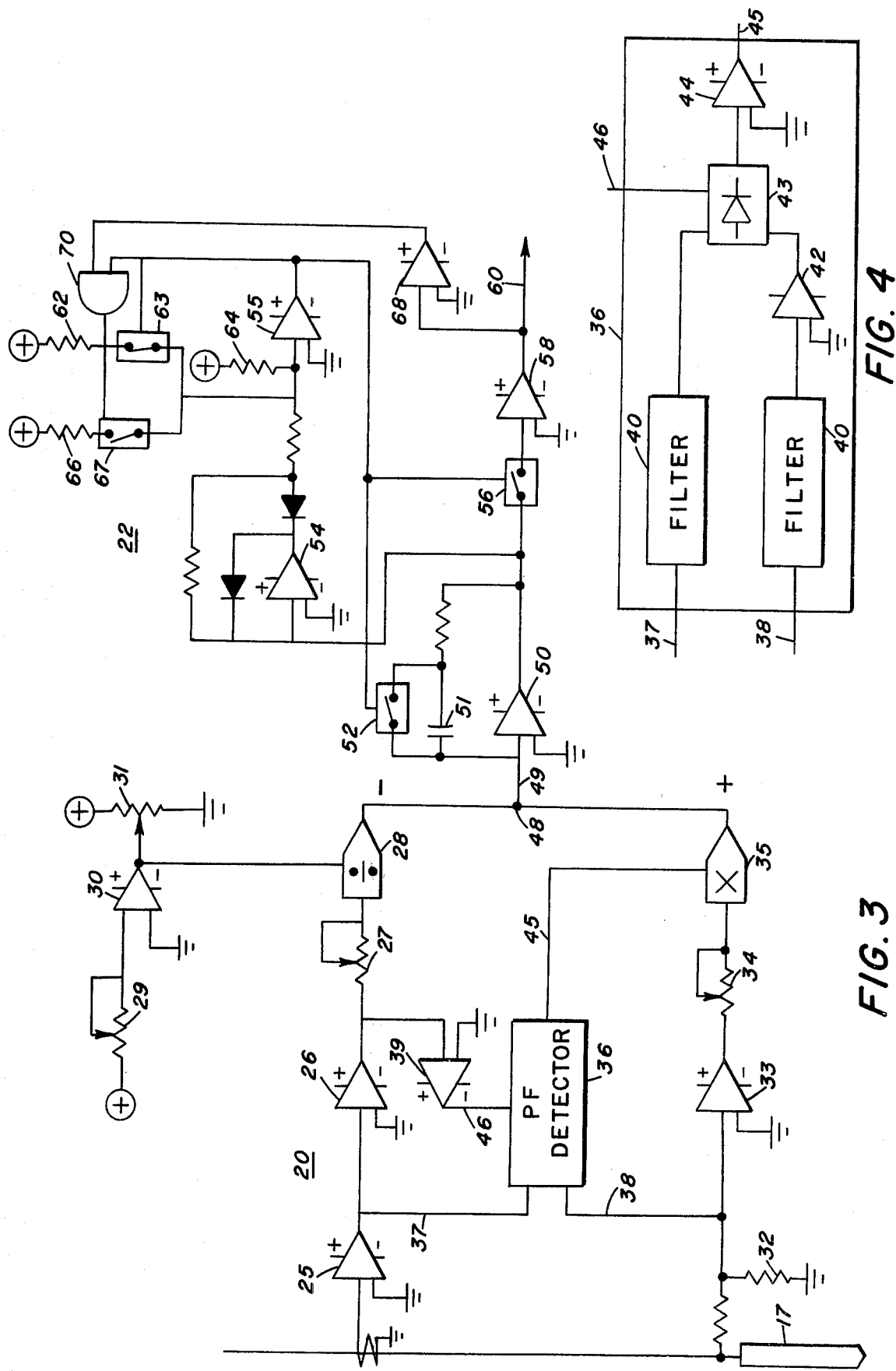

ARC FURNACE CONTROL SYSTEM

BACKGROUND OF THE INVENTION

The present invention relates to the control of electric arc furnaces, such as melting furnaces, and more particularly to a control system for automatically positioning the electrodes to maintain the desired current and arc conditions.

Arc furnaces have been automatically controlled heretofore by controlling the electrode position in accordance with the arc circuit impedance. This may be done by sensing the arc current and the arc voltage and moving each electrode as required to maintain a fixed ratio of voltage-to-current corresponding to the desired impedance. Thus, in Roberts Pat. No. 3,597,518, a system is shown in which a signal representing the arc current in an electrode is balanced against a signal representing the arc voltage to provide an error signal when the current and voltage signals become unequal, indicating a departure from the set value of arc circuit impedance. The error signal is then applied to an integrating type of regulating system to derive an analog command signal for the motor controller to raise or lower the electrode as required to reduce the error signal.

The system of the Roberts patent is in successful use but it has the disadvantage that the speed of response is influenced by the resistance of the arc circuit, and is relatively slow at low resistance values. This is for the reason that the arc circuit contains an appreciable amount of reactance, which is relatively constant as it is determined primarily by the cable runs and the mechanical structure and arrangement of the electrode. The impedance of the circuit is, of course, a function of both resistance and reactance and if the resistance is relatively high, that is, if the resistance is greater than the reactance, variation in resistance substantially changes the impedance of the circuit and arc regulation based on impedance operates satisfactorily. If the resistance is less than the reactance, however, a change in resistance has less effect on the impedance and regulation based on impedance sensing becomes increasingly insensitive as the arc resistance decreases. This results in relatively low error signals at low arc resistance and correspondingly slow response of the regulator system to position the electrodes in the desired manner. Control of the electrode position in response to the arc circuit resistance rather than the impedance would, therefore, result in faster and more accurate response of the regulating system.

SUMMARY OF THE INVENTION

The present invention provides a control system for an arc furnace which has improved speed and accuracy of response achieved by regulating the electrode position in response to the arc resistance rather than to the impedance of the arc circuit.

This is accomplished by sensing the arc current and the arc voltage and deriving signals representing the current and the voltage. The voltage signal is multiplied by a signal representing the power factor of the circuit and the modified voltage signal thus obtained is balanced against the current signal to obtain an error signal which represents the departure from the desired arc resistance. The error signal is applied to an integrating regulator circuit generally similar to that of the above-mentioned Roberts patent to derive an analog command signal which is applied to the motor control to move the electrode in a manner to reduce the error signal.

The current and voltage sensing circuits provide for processing the signals to obtain the desired level and characteristics of the error signal and to permit easy setting or adjustment of the desired arc current. An improved power factor detecting means is also included which provides a signal accurately representing the cosine of the angle between the fundamental components of the current and voltage waves, and which is independent of harmonics and of fluctuations in amplitude of the voltage and current. A signal is thus provided which can be multiplied with the voltage signal, as described above, to obtain an error signal accurately representing the error in resistance of the arc. The regulator circuit to which the error signal is applied is generally the same as that of the Roberts patent, as previously mentioned, but includes means for causing the command signal to the motors to be interrupted at a higher level of the error signal when the electrode is being raised than when it is being lowered, so as to avoid stalling and possible damage to the motor resulting from attempted operation at too low a speed.

BRIEF DESCRIPTION OF THE DRAWING

The invention will be more fully understood from the following detailed description, taken in connection with the accompanying drawing, in which:

FIG. 3 is a schematic diagram of the regulating system; and

FIG. 4 is a schematic diagram illustrating the improved power factor detector.

DESCRIPTION OF THE PREFERRED EMBODIMENT

Figure 1:
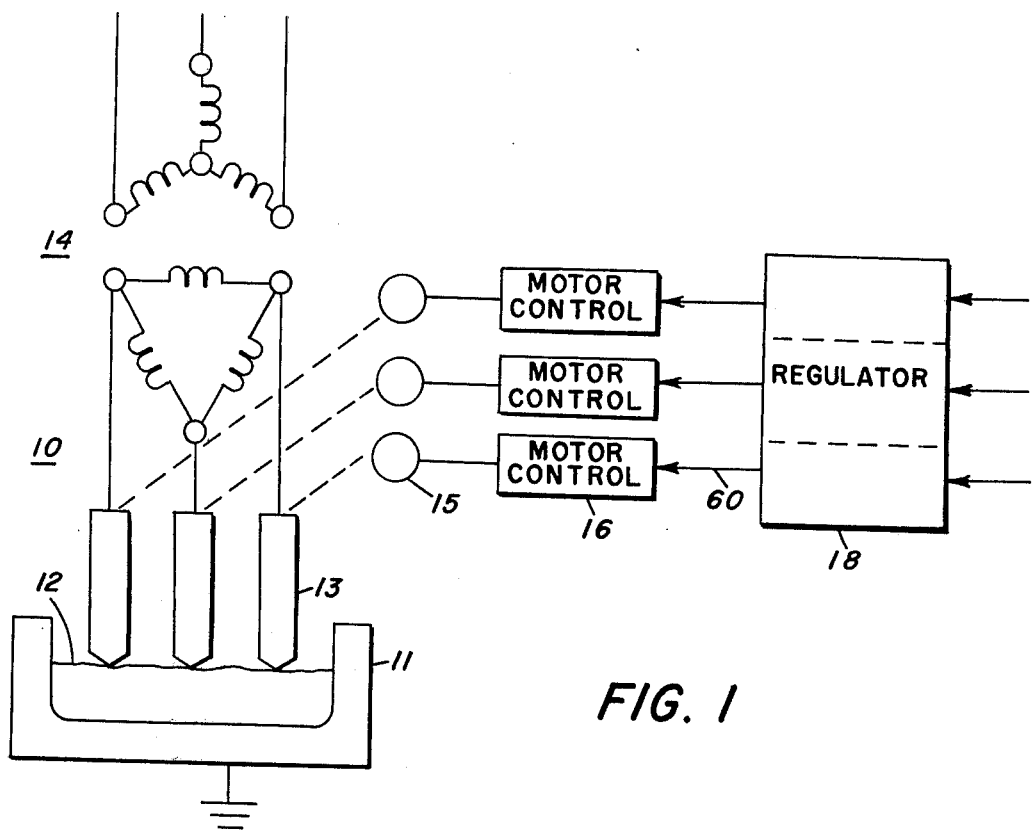
FIG. 1 is a diagrammatic representation of an electric arc furnace to which the control system of the invention may be applied.

As previously indicated, the invention provides an improved control or regulating system for positioning the electrodes of an electric arc furnace. A typical arc furnace installation to which the invention may be applied is shown diagrammatically in FIG. 1. As there shown, the furnace 10 may comprise a vessel or chamber 11 lined with a suitable refractory for containing a charge of melt 12 indicated in the molten condition in the drawing. Three electrodes 13 are shown as being supplied with electric power from a three-phase line through a power transformer 14, each of the electrodes being connected to one phase of the circuit. The electrodes 13 are positioned close to the charge 12 to maintain an arc between each electrode and the charge for initially melting the charge and for maintaining the molten pool after melting, the circuit being completed to ground as shown through the furnace.

Furnaces of this type are, of course, well known and the mechanical structure has not been illustrated since it is not a part of the invention. The electrodes 13 are mounted so that they can be independently raised and lowered as required to maintain an arc between each electrode and the surface of the charge in the furnace, and any usual or suitable structure may be used for this purpose. As illustrated diagrammatically, each electrode is provided with a hoist motor 15 suitable for reversible operation to either raise or lower the electrode to which it is connected. Each motor 15 is provided with its own motor control 16 which may be of any known type capable of controlling the motor to operate in either direction and at variable speed. The motor control devices 16 are preferably of the proportioning type adapted to be controlled by an analog command signal to operate the motor in one direction or the other, depending on the polarity of the command signal, and at a speed proportional to the magnitude of the command signal up to a maximum motor speed. Any control system capable of this type of operation may be utilized. The command signals for the motor controls 16 are provided by a regulator system generally indicated at 18. As indicated in FIG. 1, the regulator 18 preferably consists of three individual regulator circuits or systems, one for each electrode, to provide a command signal to the corresponding motor control 16 as hereinafter described.

Figure 2:
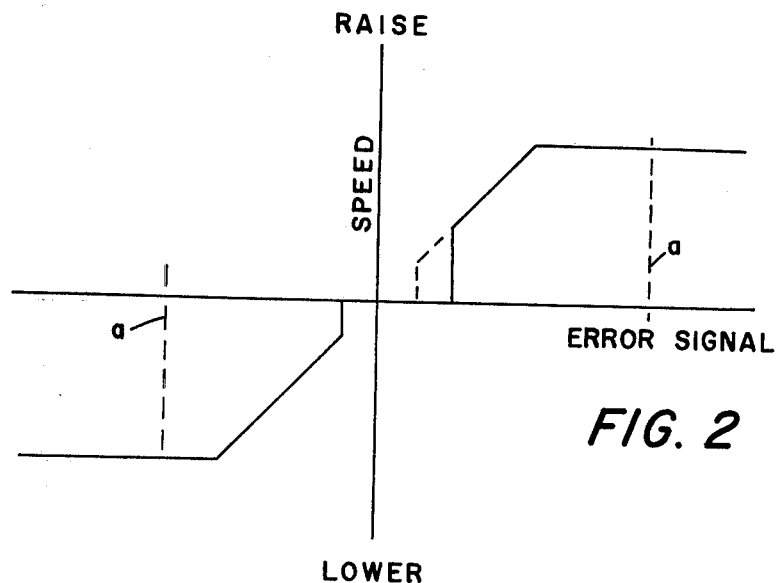
FIG. 2 is a diagram illustrating the operation of the control.

Each electrode is controlled independently and the regulator system to be described is applied to a single electrode, three such systems being included in the regulator 18 of FIG. 1. The general operation of the system is shown by the diagram of FIG. 2 in which the speed of travel of the electrode is plotted against the magnitude of the error signal which, as discussed above, represents the deviation from the desired arc resistance, high arc resistance being plotted to the left and low arc resistance to the right. The control system is of the integrating type, as will be fully described, and if the error signal is below a preset value indicated by the lines a on the diagram, no immediate command signal occurs. The control integrates the error signal, however, and after a time delay which is inversely related to the magnitude of the signal, the point a is reached and a command signal is then given to the motor control to operate the motor at the maximum speed. The electrode is either raised or lowered, as necessary to reduce the error signal, and the command signal decreases as the error is reduced to cause the electrode speed to be reduced proportionally to its position as shown by the curve of FIG. 2. At a desired low value of the error signal, which may be that corresponding to 10% error, for example, the command signal is terminated, as shown by the diagram, this portion of the curve on the raised side being shown dotted for a reason to be discussed later. At this low level of the error signal, no continuous speed command ocurs but the electrode is moved in successive small steps, with an inverse time delay between steps, to approach the zero error position.

The control and regulating system 18 of the present invention which produces the command signal is shown schematically in FIG. 3 and may be considered as consisting of a sensing portion 20 and a regulator portion 22. The sensing portion 20 generates an error signal obtained by balancing a signal representative of the electrode current against a signal representative of the arc voltage multiplied by the power factor in the arc circuit.

The error signal e therefore is equal to the difference between these signals:

$$e = I_E K_I - K_V V_E \cos(\theta) \qquad (1)$$

where
$I_E$ = electrode current
$V_E$ = arc voltage
$\cos(\theta)$ = arc circuit power factor
$K_I, K_V$ = proportionality constants When the error signal is zero, equation (1) becomes:

$$(V_E' \cos(\theta'))/(I_E') = K_I/K_V \qquad (2)$$

As described above, the electrode circuit has both inductive reactance and resistance, and the impedance Z therefore includes both reactive and resistive components with phase angle $\theta$. The resistance R therefore is $Z \cos\theta$.

$$Z = V_E/I_E$$

substituting in equation (2):

$$Z \cos\theta = R = K_I/K_V$$

The error signal, therefore, is zero when the arc resistance has the desired value equal to $K_I/K_V$ and the system operates to maintain the desired arc resistance by reducing the error signal to zero. The value of R is determined by the constants $K_I$ and $K_V$ which are fixed by the circuit constants and $K_I$ is adjustable to set the arc current and resistance as described below.

The error signal is generated by the sensing portion 20 of the control system of FIG. 3 which includes means for sensing the current and the arc voltage of a single electrode 13. Any suitable means may be used for this purpose. As shown, the current is sensed by a current transformer 24 which may be located at any desired or convenient point to respond to the current flowing in the electrode circuit and the arc. The output of the current transformer 24, which is proportional to the current, is amplified in an operational amplifier 25 to provide a current signal of desired magnitude which is then further processed by an amplifier 26, which functions as a precision rectifier, to provide a direct current signal of desired level and polarity accurately representing the arc current. This current signal may then pass through a calibrating resistor 27 which is adjustable to permit calibration to compensate for the use of different power transformer taps, or other purposes, and is applied to a solid-state divider 28 which is preferably an integrated circuit device of known type. An adjusting or setting signal is also supplied to the divider 28 to permit setting the desired value of arc current or resistance. This signal is derived from a suitable power source through a rheostat 29 and an operational amplifier 30 to supply an adjustable signal of the desired characteristics to the divider 28, the signal being adjustable by means of the rheostat 29. Preferably, a minimum current signal is set by an adjustable bias applied to the output of the amplifier 30 from a potentiometer 31 to prevent the possibility of supplying a zero current signal to the divider 28. The arc current signal is divided in the divider 28 by the adjustable signal from the amplifier 30 to provide an adjusted current signal of desired magnitude and polarity which may, for example, be −4 volts at the balance point.

A voltage signal representative of the arc voltage is also obtained by any suitable sensing means. As shown in FIG. 3, the voltage signal is obtained from a voltage divider 32 although a potential transformer might be used if desired. The voltage signal is applied to an operational amplifier 33 which functions as a precision rectifier to provide a direct current signal of desired level and polarity. This signal representing the arc voltage is supplied through a calibrating resistor 34 to a solid-state multiplier 35 which may be an integrated circuit device of known type.

A power factor detector 36 is also provided to measure the power factor of the arc circuit. A signal representative of the arc current is supplied to the detector 36 through a lead 37 from the output of the amplifier 25 and a voltage signal is supplied through a conductor 38 from the voltage divider 32. A zero current detector is also provided and may comprise an operational amplifier 39 connected to the output of the amplifier 26 to provide a signal to the power factor detector 36 if the current falls to zero.

Accurate measurement of the power factor is essential to proper operation of the system and since the magnitude and waveform of the arc current and voltage may vary considerably, conventional power factor meters are not suitable. A high satisfactory power factor detector is shown in FIG. 4, although any suitable detector capable of providing a sufficiently accurate measurement might be used. In order to eliminate the effect of harmonics, the current and voltage signals supplied to the detector 36 are passed through matched filters 40, such as active Butterworth filters for example, which eliminate the harmonics and pass only the fundamental components of the current and voltage waves. The voltage signal is transformed to a square wave of fixed amplitude and reconverted to a sine wave by the operational amplifier 42. Both current and voltage waves are then applied to a switching type of solid-state rectifier 43 in which the voltage wave is rectified, using the current wave as the switching control, in a manner which results in an output signal representing the cosine of the angle between the two waves. The output of the rectifier 43 is passed through an operational amplifier 44 to supply a final direct current output signal on the output lead 45 of desired polarity and level and which is accurately proportional to the cosine of the angle between the fundamental components of the arc current and voltage, and independent of fluctuations in magnitude or waveform of the current and voltage. The zero current detector 39 supplies a signal on conductor 46 to the rectifier 43 in case the arc current falls to zero. This zero current signal is necessary to prevent an erroneous power factor signal if the current vanishes, and it is applied to the switching rectifier in a manner to provide a predetermined output, which may be equal to the maximum output of the detector, in case of zero current.

The power factor signal from the detector 36 is applied through the conductor 45 to the multiplier 35 which multiplies the voltage signal by the power factor signal to provide a modified voltage signal which is balanced against the current signal from the divider 28. The voltage signal is calibrated so that the final modified voltage signal is equal and opposite to the current signal when the arc has the desired resistance. This may, for example, be +4 volts so that the voltage at the balance point 48 is zero when the arc resistance and current have their correct values. As previously indicated the desired arc current may be set manually by means of the rheostat 29. The output of the amplifier 30 derived from the rheostat 29 is divided into the arc current signal in the divider 28, and if it is desired to change the set value of arc current, the output of the amplifier 30 is adjusted so that when the new current is divided by the amplifier output, the result is the same as before, and the system will balance at the new value of arc current.

If the arc resistance or current deviates from the set value, the current signal and modified voltage signal no longer balance, and an error voltage appears at the point 48. The error signal thus provided by the sensing portion 20 of the system is applied by the conductor 49 to the regulator circuit 22. As previously mentioned, this is an integrating control system essentially like that of the above-mentioned Roberts patent. The error signal is applied to an operational amplifier 50 which has an integrating capacitor 51 in its feedback circuit. A solid-state switch 52 of any suitable type is connected across the capacitor 51 and is initially open as shown. The output of the amplifier 50 is applied to another operational amplifier 54 which functions as a control and rectifying device, as more fully explained in the Roberts patent, and which provides an output of proper polarity and magnitude to turn ON an amplifier 55 when the amplifier 54 is activated. The output of the amplifier 55 controls the switch 52 and another solid-state switch 56 which connects the error signal from the amplifier 50 to another operational amplifier 58. The amplifier 58 processes the error signal to provide the final command signal to the motor control on a conductor 60.

In the operation of the system, as so far described, the error signal applied to the amplifier 50 is integrated by the capacitor 51 to provide an inverse time delay. That is, if the magnitude of the error signal is below the level necessary to activate the amplifier 54, which corresponds to the point a of FIG. 2, the capacitor 51 charges and after a time inversely related to the error signal, the output of the amplifier 50 reaches the necessary level. If the magnitude of the error signal is initially above this level, then there is, of course, no time delay. When the output of the amplifier 50 reaches the necessary level, therefore, the amplifier 54 is activated and turns ON the amplifier 55. The output of the amplifier 55 actuates the switch 56 to make it conductive and, after a brief time delay, closes the solid-state switch 52 to short-circuit and discharge the capacitor 51. The output of the amplifier 50, which is proportional to the error signal, is thus supplied through the switch 56 to the amplifier 58 which provides an output of the desired level and of polarity and magnitude determined by the error signal. This output is applied to the conductor 60 as a command signal for the motor control 16.

The turn-on or activating level of the amplifier 54 is set by a bias voltage supplied through a resistor 62 and an initially-closed solid-state switch 63 to the output of the amplifier. When the amplifier 55 is turned ON as described above, in addition to actuating the two switches previously mentioned, it also actuates the solid-state switch 63 to the open or non-conducting state to disconnect the bias 62. This reduces the turn-off voltage level of the amplifier 54 to a relatively low level, determined by a fixed bias 64. The switches 52 and 56 therefore remain closed until the error signal is reduced to a very low value when the amplifier 54 is deactivated and turns OFF the amplifier 55. The switch 56 then opens to interrupt the command signal and the switches 52 and 63 also revert to their initial positions.

Operation as described may in some instances involve a risk of damage to the electrode hoist motor. Thus, when the electrode is being raised, the arc resistance error and the error signal are decreasing. The command signal is therefore also decreasing to call for lower motor speed. At low speeds and high load, the motor may stall resulting in high armature currents that can cause damage without tripping the motor protective device. In order to avoid these effects, an additional safety feature may be provided. For this purpose a second bias signal is provided for the amplifier 54 to raise the turn-off voltage level. This second bias is applied to the output of the amplifier through a resistor 66 and a solid-state switch 67. To control this bias voltage, a direction sensitive device is provided consisting of an operational amplifier 68 connected to the output of the amplifier 58 and arranged to provide an output signal when the command signal on the conductor 60 is of the polarity which calls for the electrode to be raised. This signal and the output of the amplifier 55 are applied through an AND gate 70 to the solid-state switch 67 to cause it to become conductive when the electrode is being raised. The effect of this is to change the setting of the amplifier 54 such that it turns OFF the amplifier 55 at a higher level when the electrode is being raised than when it is being lowered, thus stopping the motor before it can stall and possibly cause damage.

The control system thus operates to control the position of the electrodes in the manner previously described and as shown in FIG. 2. The sensing circuit 20 provides an error signal representing the departure of the arc resistance from the desired value determined by the current setting. The error signal is integrated by the amplifier 50, to obtain an inverse time delay, and when it reaches a set value, such as that indicated at point $a$ of FIG. 2, the amplifier 55 is turned ON by the amplifier 54 and a command signal derived from the amplifier 58 is applied through conductor 60 to the motor control 16. The electrode is then raised or lowered at maximum speed until the error is reduced and the electrode speed is then reduced along the curve shown in FIG. 2 proportionally to the error signal or the electrode position. When the error has been reduced to the desired minimum value, the command signal is interrupted and the electrode coasts to zero speed. As indicated by the solid portion of the raise side of the curve, this may occur at a higher value of error signal when the electrode is being raised than when it is being lowered for the reason explained above. In the absence of this feature, the curve would be the same for both raising and lowering as indicated by the dotted portion of the curve, and in many cases this would be satisfactory. After the command signal has thus been interrupted, if a small error signal is still present, it will be integrated as before by the amplifier 50 and after a time delay amplifier 54 is activated so that the amplifier 55 is momentarily turned ON and a command signal applied to the motor control 16. Since the error signal is below the turn-off value of the amplifier 54, however, the amplifier 55 will be immediately turned OFF as soon as the switch 63 is opened. Only a very short movement of the electrode is thus produced. This action is repeated to move the electrode in successive small steps at increasingly lower time intervals as long as the error signal is present and is in this low range. Thus, there is no deadband in the operation of the control and the error signal will ultimately be reduced to zero if no other changes occur.

It will now be seen that a control system has been provided for regulating the electrode position in an electric arc furnace which provides greatly improved speed of response and accuracy by regulating the electrode position in accordance with the arc resistance rather than the arc circuit impedance as in the systems used heretofore. This is done by balancing an arc current signal against a modified voltage signal obtained by multiplying the arc voltage by the power factor of the circuit, and the error signal thus obtained, which represents the deviation from the desired arc resistance, is used to control the electrode position. It will be obvious that although a particular embodiment of the invention has been described for the purpose of illustration, other embodiments and modifications are possible. Thus, for example, analog signals have been used in the current and voltage sensing circuits, but it will be apparent that these values could equally well be sensed digitally and the multiplication and other processing of these signals could be carried out digitally using well known equipment. Similarly, other modifications are possible within the scope of the invention.

What is claimed is:

1. A system for controlling the position of an electrode in an electric arc furnace to maintain an arc of desired resistance between the electrode and a charge in the furnace, said system comprising means for deriving a signal representative of the arc current, means for deriving a signal representative of the product of the arc voltage and the power factor of the circuit, and means responsive to said signals for controlling the position of the electrode to maintain said signals substantially equal.

2. A system as defined in claim 1 including means responsive to the difference of said signals for effecting movement of the electrode in a direction and at a speed determined by the magnitude and direction of said difference.

3. A system as defined in claim 1 and including means for setting the desired value of arc current.

4. A regulating system for controlling the position of an electrode in an electric arc furnace relative to a charge in the furnace to maintain an arc of predetermined resistance between the electrode and the charge, said system comprising means for sensing the arc current, means for sensing the arc voltage between the electrode and the charge, means for deriving a current signal from said current sensing means, means for deriving a voltage signal from said voltage sensing means, power factor detection means responsive to said current sensing means and said voltage sensing means to derive a signal representative of the power factor of the electrode circuit, means for multiplying together said voltage signal and said power factor signal to provide a modified voltage signal, circuit means for comparing said current signal and said modified voltage signal to provide an error signal representing the magnitude and direction of the difference between said signals, and means responsive to said error signal for effecting movement of the electrode in a manner to reduce the error signal.

5. A system as defined in claim 4 in which said power factor detection means comprises means for providing an output signal proportional to the cosine of the phase angle between the fundamental components of the arc current and the arc voltage.

6. A system as defined in claim 5 in which said power factor detection means includes filter means for input signals from said current and voltage sensing means to provide filtered fundamental waves of constant amplitude, and means for providing a unidirectional output signal proportional to the cosine of the angle between said fundamental waves of the input signals.

7. A system as defined in claim 6 in which said power factor detection means also includes zero current detection means for detecting the absence of current in said current sensing means, and means controlled by said zero current detection means for providing an output signal of predetermined magnitude in response to zero current.

8. A system as defined in claim 4 in which said means for deriving a current signal includes means for setting the value of the desired arc current.

9. A system as defined in claim 8 and including means for providing an adjustable current signal representing a desired value of arc current, and means for dividing the current signal from said current sensing means by said adjustable signal to derive a final current signal for comparison with said modified voltage signal.

10. A regulating system for controlling the position of an electrode in an electric arc furnace relative to a charge in the furnace to maintain an arc between the electrode and the charge, said system including means for sensing the arc current and voltage and deriving an error signal representing the deviation from a desired arc characteristic, means operative when said error signal exceeds a predetermined magnitude for effecting movement of the electrode in a direction to reduce the error signal and at a speed related to the magnitude of the error signal, and means for interrupting movement of the electrode when the error signal is reduced to a preset level lower than said predetermined magnitude, said preset level being higher when the electrode is being raised than when it is being lowered.

11. A system as defined in claim 10 including switching means responsive to the error signal for initiating a command signal to effect said movement of the electrode when the error signal exceeds said predetermined magnitude, said switching means being operative to interrupt the command signal when the error signal is reduced to a first level lower than said predetermined magnitude if the electrode is being raised, or to a second level lower than the first level if the electrode is being lowered.

12. A system as defined in claim 11 in which said switching means includes biasing means for causing operation of the switching means at said second level of the error signal, and means operative when the electrode is being raised to connect a second biasing means to cause operation of the switching means at said first level of the error signal.

* * * * *